US010417550B2

(12) United States Patent
Kwon et al.

(10) Patent No.: US 10,417,550 B2
(45) Date of Patent: Sep. 17, 2019

(54) ANTENNA DEVICE AND PORTABLE TERMINAL INCLUDING THE SAME

(71) Applicant: WITS Co., Ltd., Yongin-si, Gyeonggi-do (KR)

(72) Inventors: Soon Kwang Kwon, Suwon-si (KR); Young Seuck Yoo, Suwon-si (KR); Jung Wook Seo, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/833,443

(22) Filed: Dec. 6, 2017

(65) Prior Publication Data

US 2018/0189627 A1 Jul. 5, 2018

(30) Foreign Application Priority Data

Jan. 3, 2017 (KR) ........................ 10-2017-0000595

(51) Int. Cl.
| *H01Q 1/36* | (2006.01) |
| *H01Q 1/22* | (2006.01) |
| *H01Q 1/24* | (2006.01) |
| *H01Q 1/27* | (2006.01) |
| *H01Q 1/38* | (2006.01) |
| *G06K 19/077* | (2006.01) |
| *H04B 5/00* | (2006.01) |

(52) U.S. Cl.
CPC ..... *G06K 19/07779* (2013.01); *H01Q 1/2216* (2013.01); *H01Q 1/2225* (2013.01); *H01Q 1/243* (2013.01); *H01Q 1/273* (2013.01); *H01Q 1/36* (2013.01); *H01Q 1/38* (2013.01); *H04B 5/0031* (2013.01); *H04B 5/0037* (2013.01); *H04B 5/0062* (2013.01)

(58) Field of Classification Search
CPC .. H01Q 1/36; H01Q 1/22; H01Q 1/24; H01Q 1/38; H01Q 1/243
USPC .................................................. 343/788, 749
See application file for complete search history.

(56) References Cited

U.S. PATENT DOCUMENTS

| 5,453,752 A * | 9/1995 | Wang ........................ H01Q 1/38 343/700 MS |
| 2013/0075477 A1* | 3/2013 | Finn ................. G06K 19/07794 235/492 |
| 2014/0014732 A1* | 1/2014 | Finn ..................... G06K 19/077 235/492 |
| 2014/0091149 A1* | 4/2014 | Finn ................. G06K 19/07769 235/492 |
| 2014/0292600 A1* | 10/2014 | Sakuma .................... H01Q 1/36 343/749 |
| 2015/0021402 A1* | 1/2015 | Finn ................. G06K 19/07794 235/492 |
| 2015/0178532 A1* | 6/2015 | Brule ................. G06K 19/0717 340/5.61 |
| 2016/0118711 A1* | 4/2016 | Finn ................. G06K 19/07769 343/867 |

(Continued)

FOREIGN PATENT DOCUMENTS

| KR | 10-0854320 B1 | 8/2008 |
| KR | 10-2014-0021127 A | 2/2014 |

*Primary Examiner* — Lam T Mai
(74) *Attorney, Agent, or Firm* — Harness, Dickey & Pierce, P.L.C.

(57) ABSTRACT

An antenna device includes: an antenna wiring including a spiral wiring having a ring shape, wherein the spiral wiring includes a linear part formed as a straight line or a curved line, and a bent part formed as a meandering line.

14 Claims, 6 Drawing Sheets

(56) References Cited

U.S. PATENT DOCUMENTS

2016/0205228 A1* 7/2016 Orihara .................... H01Q 7/06
                                                                    455/575.7
2016/0315378 A1* 10/2016 Kiriyama ............. H01Q 1/3275
2017/0062914 A1* 3/2017 Masaka ................ H01Q 1/1214

* cited by examiner

ANTENNA DEVICE AND PORTABLE TERMINAL INCLUDING THE SAME

CROSS-REFERENCE TO RELATED APPLICATIONS

This application claims the benefit under 35 U.S.C. § 119(a) of Korean Patent Application No. 10-2017-0000595 filed on Jan. 3, 2017 in the Korean Intellectual Property Office, the entire disclosure of which is incorporated herein by reference for all purposes.

BACKGROUND

1. Field

The following description relates to an antenna device and a portable terminal including the antenna device.

2. Description of Related Art

A portable terminal has recently been provided with a system to wirelessly transmit power to charge a battery, or to implement functions such as radio frequency identification (RFID), near field communication (NFC), and magnetic secure transmission (MST). In addition, the aforementioned functions are generally performed through a coil form antenna wiring, and an antenna device having the antenna wiring is mounted in the portable terminal accordingly. Among these functions, NFC and MST, for example, are used for various services such as traffic management, ticketing, and wireless payments.

However, since most antenna wirings are manufactured in a simple spiral shaped pattern, a recognition rate may be decreased during wireless communications, depending on approach types or positions of the antenna wiring and a reader.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an antenna device includes: an antenna wiring including a spiral wiring having a ring shape, wherein the spiral wiring includes a linear part formed as a straight line or a curved line, and a bent part formed as a meandering line.

The spiral wiring may have an overall contour comprising a rectangular shape. The bent part may form one or more sides of the rectangular shape.

The bent part may include first patterns disposed parallel to the linear part and second patterns connecting the first patterns to each other.

The second patterns may be disposed perpendicular to the first patterns.

The spiral wiring may have an overall contour having a rectangular shape. The linear part may form width portions of the rectangular shape. The bent part may form length portions of the rectangular shape.

The antenna wiring may be configured as a magnetic secure transmission (MST) antenna.

The antenna device may further include a second antenna wiring disposed outside of the spiral wiring and configured for near field communication (NFC).

The antenna device may further include a coil wiring disposed inside of the spiral wiring and configured for wireless power transmission.

The spiral wiring may have an overall contour comprising a circular shape and the linear part may have an arc shape.

The antenna device may further include a magnetic part disposed on a surface of the antenna wiring and configured to provide a magnetic path of a magnetic field generated by the antenna wiring.

The bent part may be configured to form a magnetic field in a direction that is the same as a direction of a magnetic field formed by the linear part.

In another general aspect, a portable terminal includes: a terminal body; and a spiral wiring having a ring shape and electrically connected to the terminal body, wherein the spiral wiring includes a linear part formed as a straight line or a curved line, and a bent part formed as a meandering line.

The bent part may include first pattern portions disposed parallel to each other in a width direction of the terminal body, and second pattern portions connecting the first pattern portions to each other.

The portable terminal may further include: a strap connected to the terminal body and configured to enable the terminal body to be worn on a wrist, wherein the bent part includes first pattern portions disposed parallel to the strap, and second pattern portions connecting the first pattern portions to each other.

The terminal body may have a disk shape, and the linear part may have an arc shape.

The bent part may be configured to form a magnetic field in a direction that is the same as a direction of a magnetic field formed by the linear part.

The portable terminal may be a cellular phone or a wearable device.\

The portable terminal may further include a magnetic part disposed on a surface of the spiral wiring and configured to provide a magnetic path of a magnetic field generated by the spiral wiring.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," "coupled to," "over," or "covering" another element, it may be directly "on," "connected to," "coupled to," "over," or "covering" the other element, or there may be one or more other elements intervening therebetween. In contrast, when an element is described as being "directly on," "directly connected to," "directly coupled to," "directly over," or "directly covering" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, embodiments will be described in detail with reference to the accompanying drawings.

Figure 1:
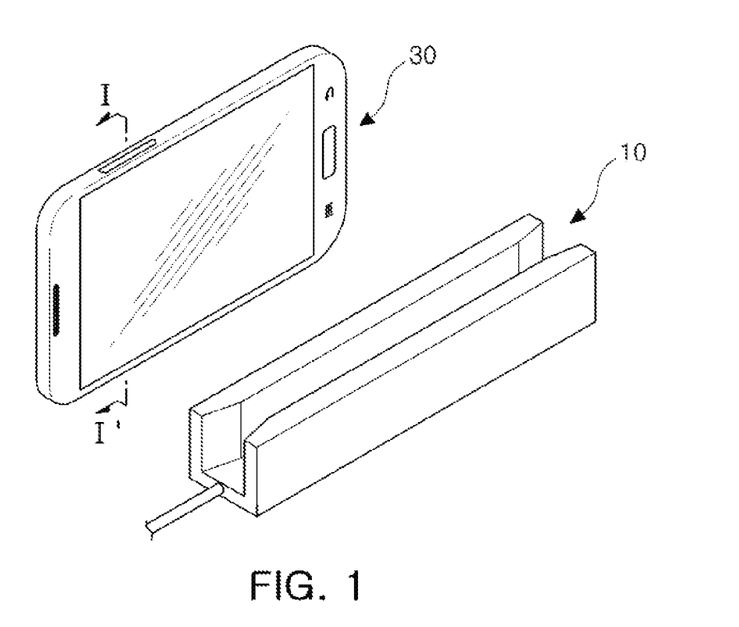
FIG. 1 is a perspective view illustrating an example in which a portable terminal, according to an embodiment, performs wireless communications.

FIG. 1 is a perspective view illustrating an example in which a portable terminal 30, according to an embodiment, performs wireless communications.

Figure 2:
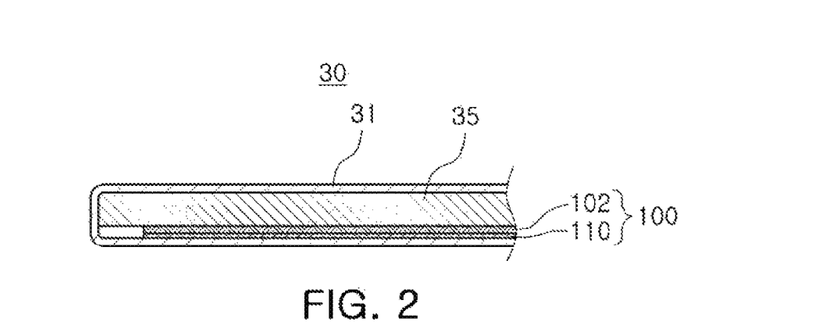
FIG. 2 is a cross-sectional view schematically illustrating a cross-section taken along a line I-I' of FIG. 1.

Referring to FIG. 1, the portable terminal 30 includes an antenna device 100 (FIG. 2). The antenna device 100 forms a magnetic field under control of the portable terminal 30.

The antenna device 100 operates as a transmitting coil and can be magnetically coupled to a wireless signal receiver 10 including a receiving coil to thereby wirelessly transmit information.

The wireless signal receiver 10 may include a magnetic card reader. However, the wireless signal receiver 10 is not limited to this configuration, and various wireless signal receivers 10 may be used as long as they can wirelessly communicate with the portable terminal 30.

Figure 3:
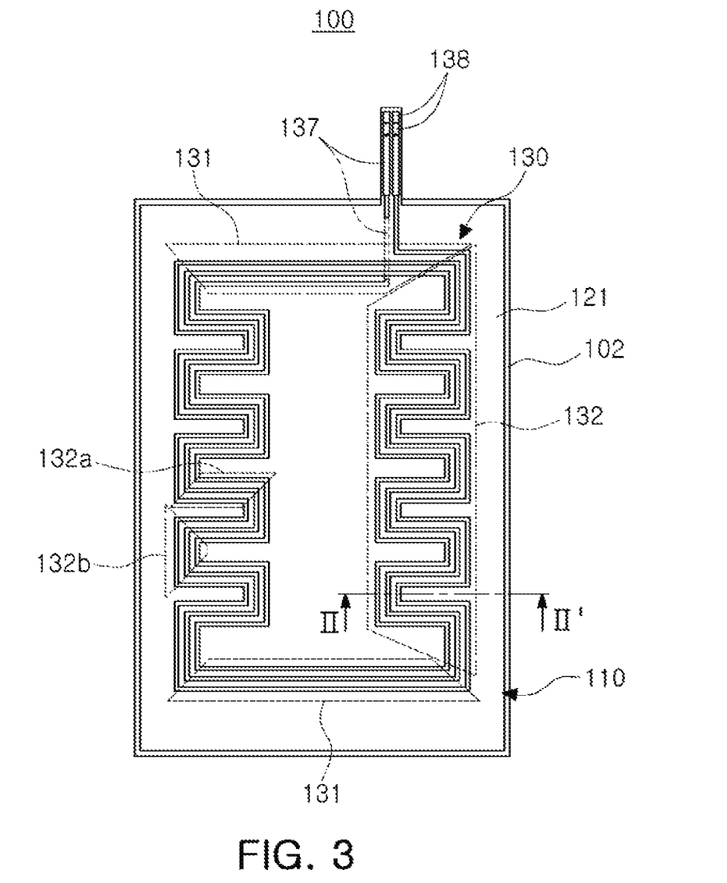
FIG. 3 is a plan view schematically illustrating an antenna device of FIG. 2.
Figure 4:
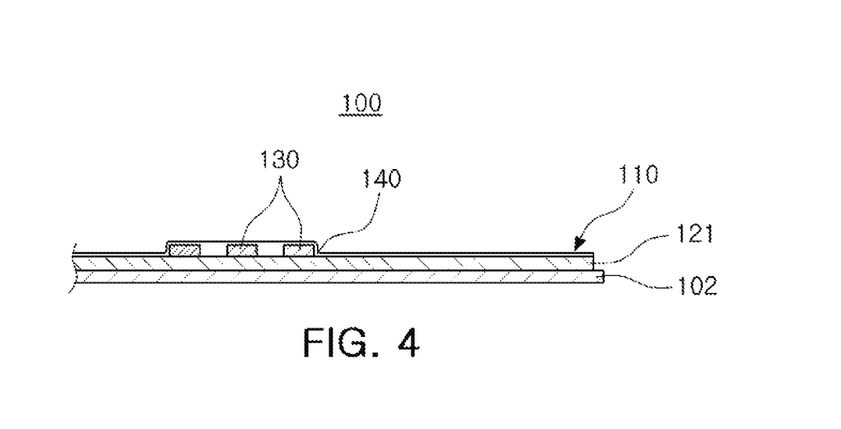
FIG. 4 is a cross-sectional view taken along a line II-II' of FIG. 3.

FIG. 2 is a cross-sectional view schematically illustrating a cross-section taken along a line I-I' of the portable terminal 30 in FIG. 1. In addition, FIG. 3 is a plan view schematically illustrating the antenna device 100 of FIG. 2, and FIG. 4 is a cross-sectional view taken along a line II-II' of FIG. 3.

The portable terminal 30 may be a cellular phone (or a smartphone). However, the portable terminal 30 is not limited to being a phone, and may be any electronic device which can be carried and can perform wireless communications, such as a notebook, a tablet PC, or a wearable device.

Referring first to FIG. 2, the portable terminal 30 includes a terminal body 35 to which main components are coupled to operate the portable terminal 30, and the antenna device 100, which performs wireless communications with the wireless signal receiver 10.

The terminal body 35 and the antenna device 100 are accommodated in a case 31 of the portable device 30. The antenna device 100 is directly attached to an inner surface of the case 31 or to be positioned maximally adjacent to the inner surface of the case 31.

Referring to FIGS. 2 through 4, the antenna device 100 includes a magnetic part 102 and a coil part 110.

The magnetic part 102 has a flat plate shape (or a sheet shape) and is disposed on one surface of the coil part 110 so as to be fixedly attached to the coil part 110. The magnetic part 102 provides a magnetic path of a magnetic field generated by an antenna wiring of the coil part 110. To this end, the magnetic part 102 is formed of a material capable of easily forming the magnetic path. For example, a ferrite sheet may be used for the magnetic part 102.

Although not illustrated, a metal sheet may also be added to an outer surface of the magnetic part 102 to shield electromagnetic waves or a leakage magnetic flux, as needed. The metal sheet may be formed of aluminum or another suitable shielding material.

In addition, the antenna device 100 may have an adhesive part (not illustrated) interposed between the coil part 110 and the magnetic part 102 so that the coil part 110 and the magnetic part 102 are firmly fixed and adhered to each other.

The adhesive part may be disposed between the coil part 110 and the magnetic part 102 and may bond the magnetic part 102 and the coil part 110 to each other. Such an adhesive part may be formed of an adhesive sheet or an adhesive tape, and may also be formed by coating a surface of the coil part 110 or the magnetic part 102 with an adhesive or a resin having adhesive properties.

In addition, the adhesive part may contain ferrite powder particles, thereby allowing the adhesive part to have magnetism together with the magnetic part 102.

The coil part 110 has a form of a substrate. More specifically, as shown in FIGS. 3 and 4, the coil part 110 includes an insulating substrate 121, an antenna wiring 130 formed on at least one surface of the insulating substrate 121, and an insulating protective layer 140.

The antenna wiring 130 may be formed on one surface or opposite surfaces of the insulating substrate 121. For example, an insulating film (e.g., a polyimide film) is used for the insulating substrate 121. In this case, the coil part 110 has a form of a flexible printed circuit board (PCB). However, the insulating substrate 121 is not limited to such a configuration, and can be formed of various materials as long as the insulating substrate 121 may have a reduced thickness and a circuit wiring may be formed on the opposite surfaces of the insulating substrate.

The antenna wiring 130 is formed using the opposite surfaces of the insulating substrate 121 and has a form of a circuit wiring formed of a copper foil, for example.

The antenna wiring 130 may be manufactured by patterning double sided copper clad laminates (CCL). In addition, the antenna wiring 130 may be formed on the opposite surfaces of a flexible insulating substrate 121 such as a film by a photolithography method, and may be manufactured in a flexible PCB (FPCB) having a double sided structure, for example.

Accordingly, the coil part 110 may have a significantly reduced thickness in comparison to conventional coil parts. However, the antenna wiring 130 may be manufactured in a multilayer substrate, or may also be manufactured in a form of the printed circuit board (PCB) having rigidity, as needed.

The coil part 110 may perform any one or any combination of any two or more of a function of radio frequency identification (RFID), a function of near field communication (NFC), and a function of magnetic secure transmission (MST. According to the disclosed embodiment, the coil part 110 can be used as an MST antenna.

Referring to FIG. 3, the antenna wiring 130 includes spiral wirings 131 and 132, a lead wiring 137, and a connection pad 138.

The connection pad 138 is a contact point at which the coil part 110 is electrically connected to the terminal body 35.

The spiral wirings 131 and 132 are disposed on one surface of the insulating substrate 121. In addition, at least a portion of the lead wiring 137 is disposed on another surface of the insulating substrate 121 that is opposite to the one surface of the insulating substrate 121. The lead wiring 137 is a wiring connecting the spiral wirings 131 and 132 and the connection pad 138 to each other. However, the configuration of the antenna wiring 130 is not limited to this example, and various modifications are possible. For example, the spiral wirings 131 and 132 may also be formed on the other surface of the insulating substrate 121, or the entirety of the lead wiring 137 may be disposed on the other surface of the insulating substrate 121.

The spiral wirings 131 and 132 are formed to have a spiral shape and are generally formed to have a ring shape in which a space is included.

The spiral wirings 131 and 132 are classified as a linear part 131 and a bent part 132, depending on the shape of the wiring.

The linear part 131 is a section in which the wiring is formed to have a linear shape. Here, the linear shape includes both a straight line and a curved line.

As the portable terminal 30 is formed to have a rectangular shape as illustrated in FIG. 1, the spiral wirings 131 and 132 have an overall contour of a rectangular shape. In addition, the linear part 131 is elongated in a width direction of the portable terminal 30.

The bent part 132 is formed on at least one side of four sides forming a rectangle (the rectangular shape).

More specifically, in the rectangular shape of the spiral wirings 131 and 132, two sides (e.g., width portions or width sides) opposing each other are the linear part 131 and the remaining two sides (e.g., length portions or length sides) are the bent part 132.

The bent part 132 is a section in which the wiring is formed to be bent. More specifically, the bent part 132 is formed to have a winding meandering line or path. Further, the two length portions opposing each other in the rectangular shape may have line symmetry.

The meandering line of the bent part 132 includes first pattern portions 132a that are parallel to the linear part 131, and second pattern portions 132b that are perpendicular to the linear part 131 and connect the first pattern portions 132a to each other.

Since the first pattern portion 132a is parallel to the linear part 131, the first pattern portion is also elongated along the width direction of the portable terminal 30.

Further, since the first pattern portion 132a is parallel to the linear part 131, a magnetic field (hereinafter, referred to as a first magnetic field M1 (see FIG. 5)) is generated in the first pattern portion 132a in the same direction as the direction of a magnetic field generated in the linear part 131. In addition, since the second pattern portion 132b is perpendicular to the linear part 131, a magnetic field (hereinafter, referred to as a second magnetic field M2 (see FIG. 5)) is generated in the second pattern portion 132b in a direction perpendicular to the direction of the magnetic field generated in the linear part 131.

Figure 5:
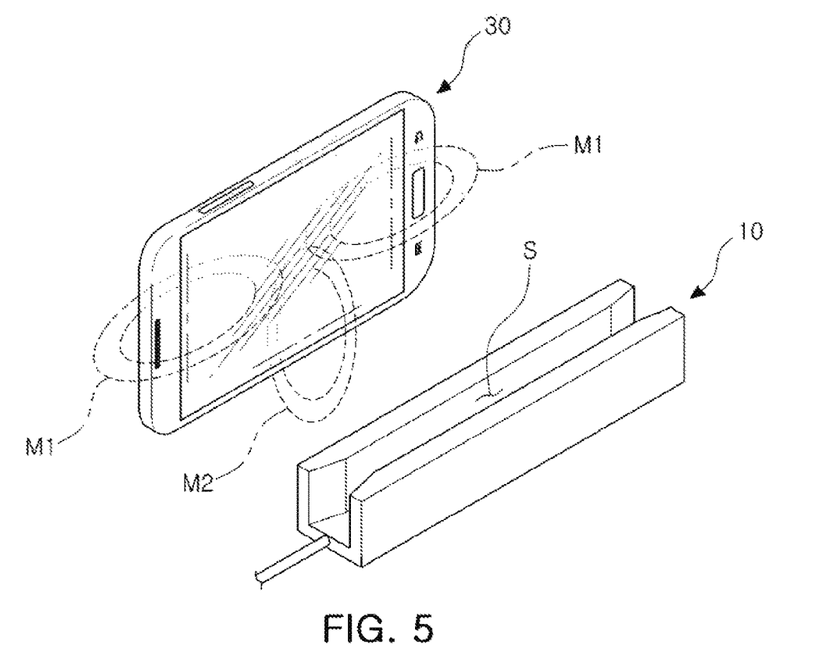
FIGS. 5 and 6 are views illustrating examples of wireless communications between a portable terminal and a wireless signal receiver.
Figure 6:
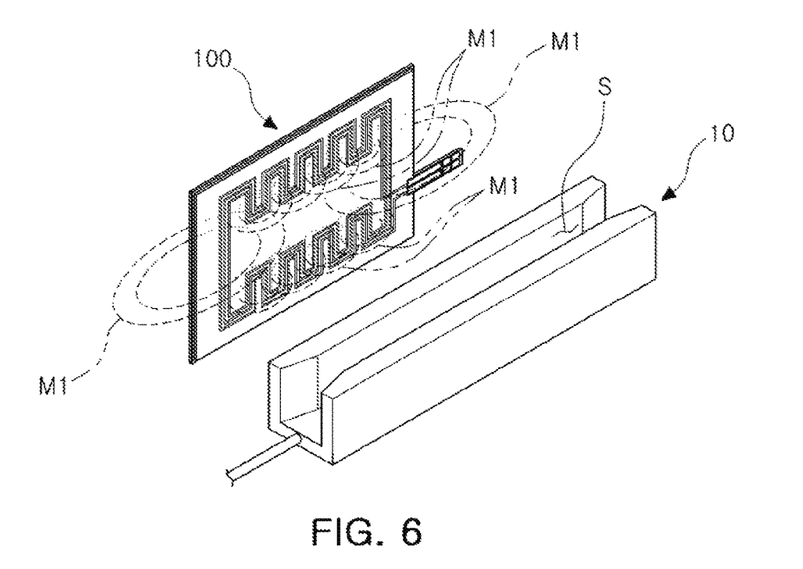

FIGS. 5 and 6 are views illustrating wireless communications between the portable terminal 30 and the wireless signal receiver 10, according to an embodiment.

Referring first to FIG. 5, in the case of magnetic secure transmission (MST), when the magnetic field, like the first magnetic field M1 generated in the portable terminal 30, is formed parallel to a card insertion slot S formed in the wireless signal receiver 10 (hereinafter, referred to as a magnetic card reader), a recognition rate may be increased.

On the other hand, when the magnetic field, like a second magnetic field M2, is formed in a direction perpendicular to the card insertion slot S, the recognition rate may be rapidly decreased.

Further, in a case in which magnetic secure transmission (MST) is used, the user may generally perform wireless communications while approaching the magnetic card reader 10 with the portable terminal 30 as illustrated in FIG. 5. As a result, the portable terminal 30 may be disposed so that a length direction of the portable terminal 30 is parallel to the length direction of the magnetic card reader 10.

In this case, as illustrated in FIG. 6, the first magnetic field M1 having a high recognition rate is primarily formed by the linear part 131. Therefore, when the linear part 131 is located adjacent to a magnetic head (not shown) included in the magnetic card reader 10, the recognition rate is increased, and when the linear part 131 is located far away from a magnetic head (not shown) included in the magnetic card reader 10, the recognition rate is decreased.

To solve such a problem, the antenna device 100 includes the bent part 132. The bent part 132 includes the first pattern portions 132a which are disposed to be parallel to the linear part 131.

The magnetic field M1, which is parallel to the card insertion slot S, may be formed in each of the first pattern portions 132a in the same manner as the linear part 131.

As a result, the antenna device 100 can smoothly communicate with the magnetic card reader 10 through the magnetic field M1 formed in the first pattern portions 132a of the bent part 132 even if a distance between the linear part 131 and the magnetic head is increased. Therefore, the recognition rate is not increased only in a specific position and a high recognition rate is maintained throughout the portable terminal 30.

Conventionally, all sides of spiral wirings of a rectangular shape have the same shape as the linear part 131. In this case, since the first magnetic field M1 is not formed in the length surfaces of the spiral wirings 131 and 132, the recognition rate in the length surfaces may be significantly decreased.

In the antenna device 100, however, since the first magnetic field M1 is formed not only in the width surfaces but also in the length surfaces, the recognition rate of the portable terminal 30 may be significantly increased.

The insulating protective layer 140 may be disposed on an antenna wiring 130, as described below. The insulating protective layer 140 is provided to protect the antenna wiring 130 from the outside environment and to provide insulation from the outside environment. The connection pad 138 may be in contact with an external component and may be electrically connected to the external component. Therefore, the insulating protective layer 140 is partially removed from the connection pad 138, and, as a result, at least a portion of the connection pad 138 is externally exposed.

The embodiment described above is an example in which the coil part 110 has the antenna wiring 130 formed on the insulating substrate 121 as a conductive wiring. However, the disclosure is not limited to such a configuration.

For example, the coil part 110 may be modified in various ways. For example, the coil part 110 may be formed of a press coil formed by press-processing a metal board, or a flat type coil (an edge wise coil) coated with an insulating coating.

The disclosure is not limited to the embodiments described above, and may be modified in various ways.

Figure 7:
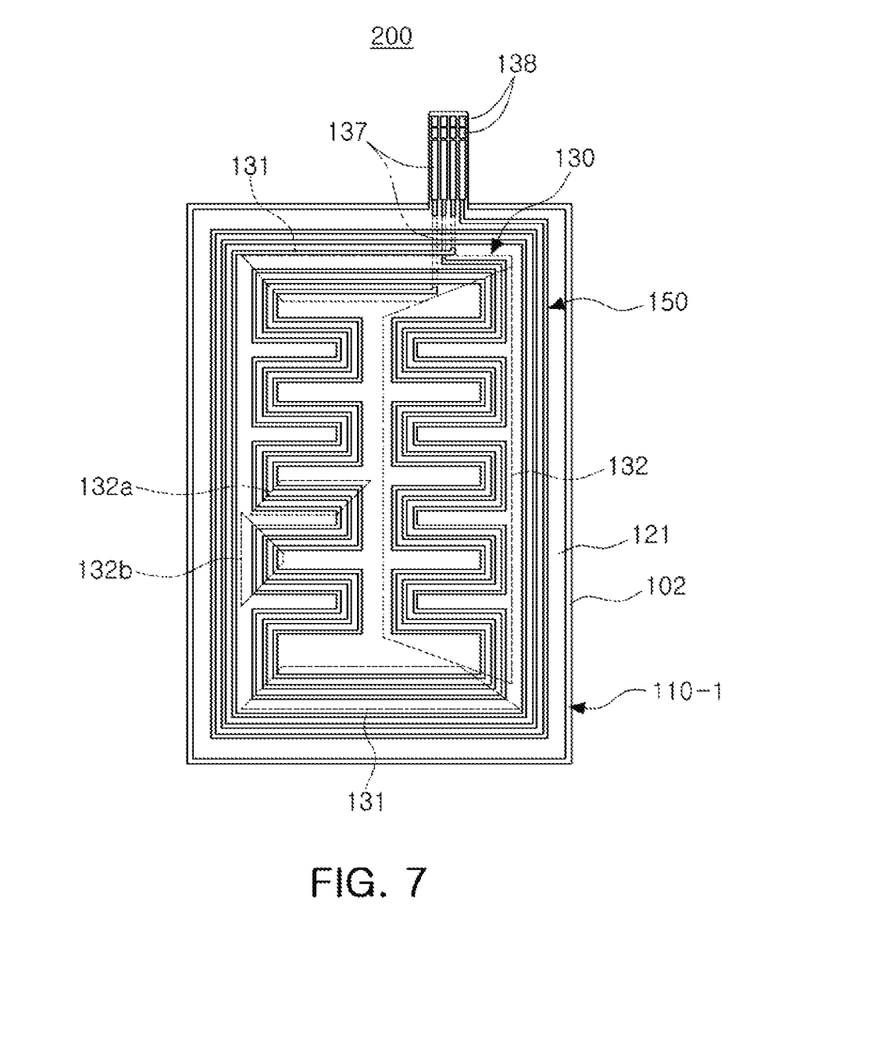
FIGS. 7 and 8 are plan views each schematically illustrating antenna devices, according to other embodiments.
Figure 8:
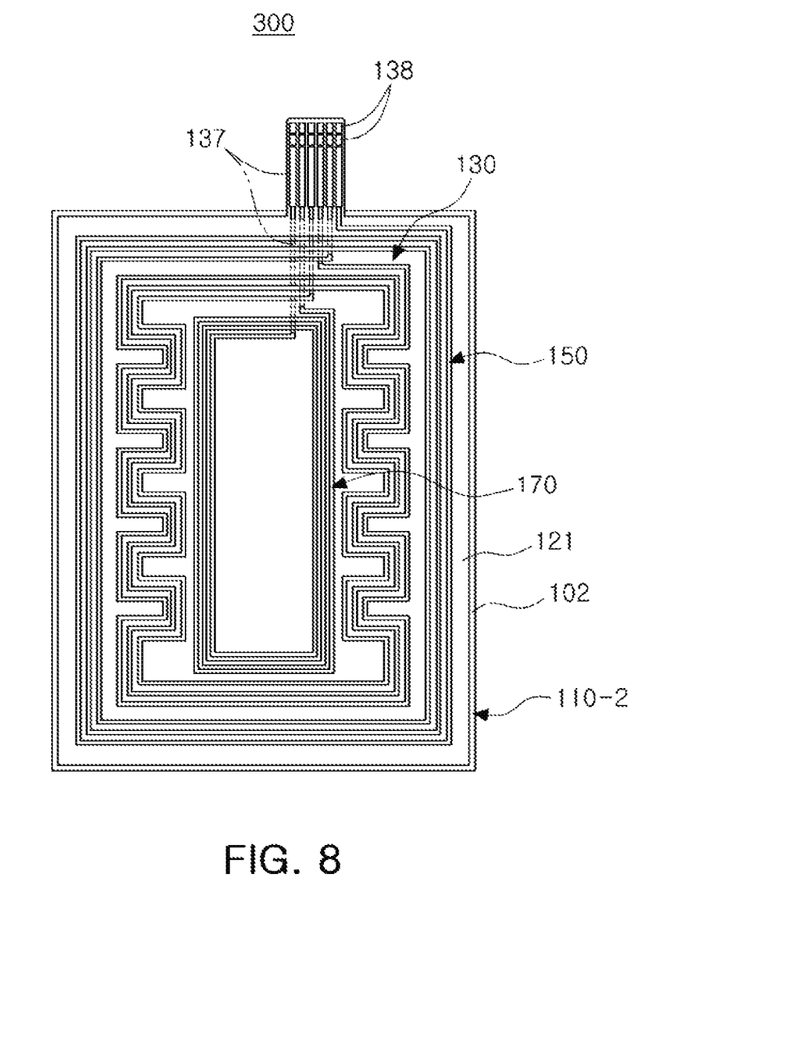

FIGS. 7 and 8 are plan views schematically illustrating antenna devices 200 and 300, respectively, according to other embodiments.

Referring first to FIG. 7, a coil part 110-1 of the antenna device 200 includes first and second antenna wirings 130 and 150, which are used as antennas. The first and second antenna wirings 130 and 150 perform any one or any combination of any two or more of a function of radio frequency identification (RFID), a function of near field communication (NFC), and a function of magnetic secure transmission (MST).

For example, the first antenna wiring 130 is an antenna used for magnetic secure transmission (MST) and the second antenna wiring 150 is an antenna used for near field communication (NFC).

The second antenna wiring 150 is a ring type antenna having a spiral shape.

The first antenna wiring 130 is formed in the same manner as the antenna wring 130 (described above with respect to FIG. 3, and is disposed inside the second antenna wiring 150.

Since the first antenna wiring 130 includes the bent part 132, space is efficiently used due to a structure in which the first antenna wiring 130 is disposed inside the second antenna wiring 150. However, the disclosure is not limited to such a configuration.

Referring to FIG. 8, a coil part 110-2 of the antenna device 300 includes the first and second antenna wirings 130 and 150 which are used as the antennas, and a coil wiring 170 used to transmit and receive power for wireless charging. Similarly to the embodiment described above with respect to FIG. 7, the first and second antenna wirings 130 and 150 may respectively perform at any one or any combination of any two or more of a function of radio frequency identification (RFID), a function of near field communication (NFC), and a function of magnetic secure transmission (MST).

For example, the first antenna wiring 130 is an antenna used for magnetic secure transmission (MST) and the second antenna wiring 150 is an antenna used for near field communication (NFC).

The coil wiring 170 is disposed inside the first antenna wiring 130. Therefore, the first antenna wiring 130 is disposed in a space formed between the second antenna wiring 150 and the coil wiring 170. However, the first and second antenna wirings 130 and 150, and the coil wiring 170 are not limited to such a configuration.

As described above in the embodiments of FIGS. 7 and 8, an antenna device may selectively include the additional antenna wiring 150 and the coil wiring 170 for wireless charging.

Figure 9:
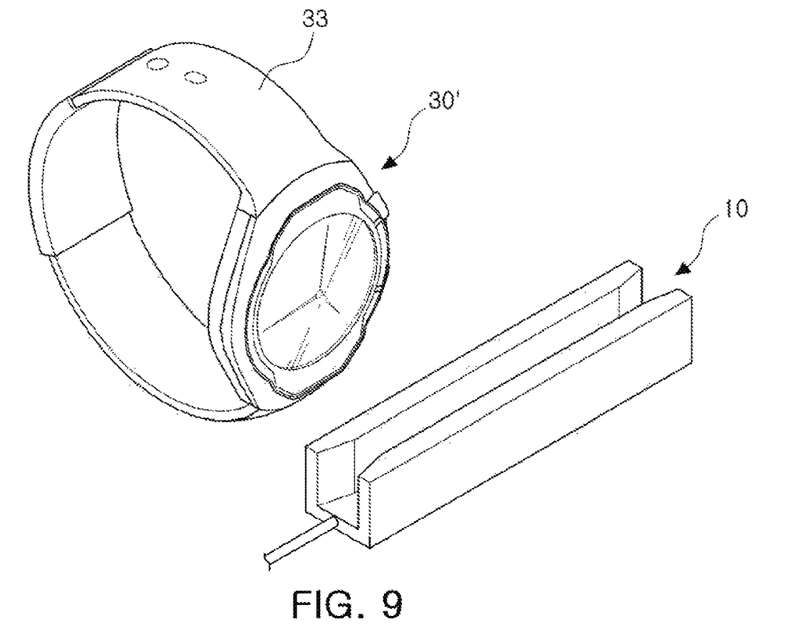
FIG. 9 is a perspective view schematically illustrating a portable terminal and a wireless signal receiver, according to another embodiment.
Figure 10:
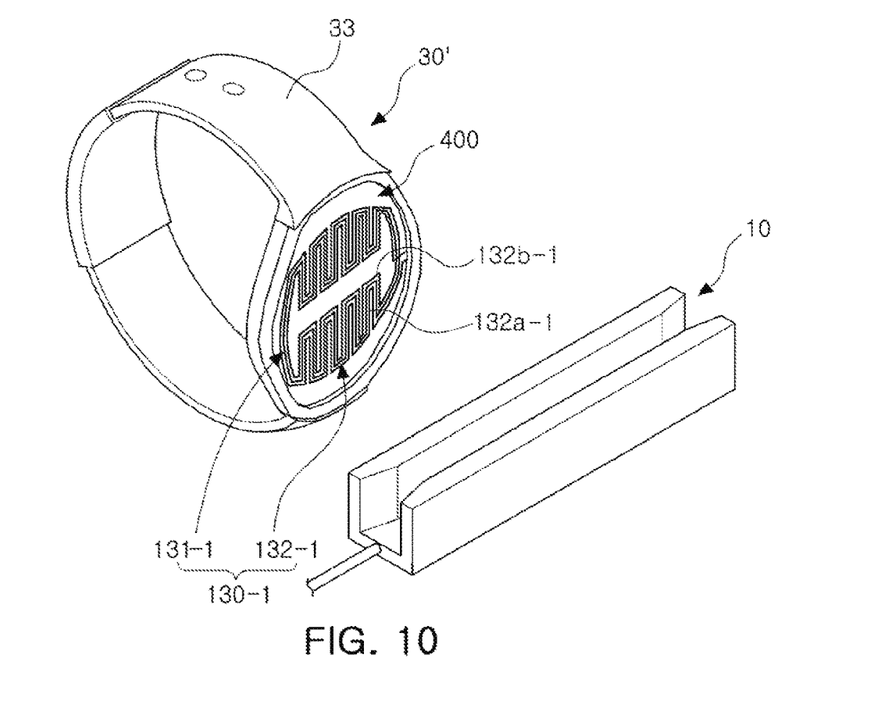
FIG. 10 is a view illustrating an antenna device included in the portable terminal of FIG. 9, according to an embodiment.

FIG. 9 is a perspective view schematically illustrating a portable terminal 30' and the wireless signal receiver 10, according to another embodiment. FIG. 10 is a view illustrating an antenna device 400 included in the portable terminal 30' of FIG. 9.

Referring to FIGS. 9 and 10, the portable terminal 30' is a wearable device.

In this description, a wearable device is an electronic device that can be worn on a body part such as an arm or a head, or can be fixed to a specific structure by a strap. In FIGS. 9 and 10, the portable terminal 30' is a wristwatch. However, the portable terminal 30' may be any other type of wearable device.

The portable terminal 30' includes a terminal body having a disk shape, and includes a strap 33 connected to the terminal body to enable the terminal body to be worn on a wrist.

Further, an antenna device 400 also has the disk shape corresponding to the shape of the terminal body, and includes an antenna wiring 130-1 having spiral wirings 131-1 and 132-1 that have an overall contour of a circular shape (or an oval shape).

Accordingly, the linear parts 131-1 of the antenna wiring 130 have a curved arc shape and the bent parts 132-1 have a bending shape of a meandering line between the linear parts 131-1. The bent parts 132-1 include first pattern portions 132a-1 and second pattern portions 132b-1. However, the linear parts 131-1 are not limited to above-described configuration, and may also be formed to have a straight line form.

The portable terminal 30' is easily used for payment in a state in which the arm of the user is generally disposed to be parallel to the magnetic card reader 10.

Therefore, the antenna device 400 of the portable terminal 30' is configured so that first pattern portions 132a-1 are disposed to be parallel to a length direction of the strap 33 of the portable terminal 30'. Further, as the linear part 131-1 is formed to have the arc shape, the linear part 131-1 is not parallel to the first pattern portions 132a-1, but may be disposed to be similar to a direction in which the first pattern portions 132a-1 are disposed.

As set forth above, according to the embodiments described herein, an antenna device may maintain a high recognition rate throughout a portable terminal during wireless communications between the portable terminal and a wireless signal receiver.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna device, comprising:
an antenna wiring comprising a spiral wiring comprising a ring shape, wherein the spiral wiring comprises
a linear portion formed as a straight line or a curved line, and
a bent portion formed as a meandering line,
wherein the spiral wiring comprises an overall contour comprising a rectangular shape,
wherein the bent portion forms one or more sides of the rectangular shape, and comprises first patterns disposed parallel to the linear portion and second patterns connecting the first patterns to each other, and
wherein the second patterns are disposed perpendicular to the first patterns.

2. An antenna device, comprising:
an antenna wiring comprising a spiral wiring comprising a ring shape, wherein the spiral wiring comprises
a linear portion formed as a straight line, and
a bent portion formed as a meandering line,
wherein the spiral wiring comprises an overall contour comprising a rectangular shape,
wherein the linear portion forms width portions of the rectangular shape, and
wherein the bent portion forms length portions of the rectangular shape.

3. An antenna device, comprising:
an antenna wiring comprising a spiral wiring comprising a ring shape, wherein the spiral wiring comprises
a linear portion formed as a straight line or a curved line, and
a bent portion formed as a meandering line, and
wherein the antenna wiring is configured as a magnetic secure transmission (MST) antenna.

4. The antenna device of claim 3, further comprising a second antenna wiring disposed outside of the spiral wiring and configured for near field communication (NFC).

5. The antenna device of claim 3, further comprising a coil wiring disposed inside of the spiral wiring and configured for wireless power transmission.

6. An antenna device, comprising:
an antenna wiring comprising a spiral comprising a ring shape, wherein the spiral wiring comprises
a linear portion formed as a straight line or a curved lined, and
a bent portion formed as a meandering line, and
wherein the spiral wiring comprises an overall contour comprising a circular shape and the linear portion comprises an arc shape.

7. An antenna device, comprising:
an antenna wiring comprising a spiral wiring comprising a ring shape, wherein the spiral wiring comprising
a linear portion formed as a straight line or a curved line, and
a bent portion formed as a meandering line; and
a magnetic part disposed on a surface of the antenna wiring and configured to provide a magnetic path of a magnetic field generated by the antenna wiring.

8. An antenna device, comprising:
an antenna wiring comprising a spiral wiring comprising a ring shape, wherein the spiral wiring comprises
a linear portion formed as a straight line or a curved line, and
a bent portion formed as a meandering line, and
wherein the bent portion is configured to form a magnetic field in a direction that is the same as a direction of a magnetic field formed by the linear portion.

9. A portable terminal, comprising:
a terminal body; and
a spiral wiring comprising a ring shape and electrically connected to the terminal body,
wherein the spiral wiring comprises a linear portion formed as a straight line or a curved line, and a bent portion, formed as a meandering line, and
wherein the bent portion comprises first pattern portions disposed parallel to each other in a width direction of the terminal body, and second pattern portions connecting the first pattern portions to each other.

10. The portable terminal of claim 9, wherein the portable terminal comprises a cellular phone or a wearable device.

11. A portable terminal, comprising:
a terminal body;

a spiral wiring comprising a ring shape and electrically connected to the terminal body; and a strap connected to the terminal body and configured to enable the terminal body to be worn on a wrist, wherein the spiral wiring comprises a linear portion formed as a straight line or a curved line, and a bent portion formed as a meandering line, and wherein the bent portion comprises
  first pattern portions disposed parallel to the strap, and
  second pattern portions connecting the first pattern portions to each other.

12. The portable terminal of claim 11, wherein the terminal body comprises a disk shape, and the linear part comprises an arc shape.

13. A portable terminal comprising:
a terminal body; and
a spiral wiring comprising a ring shape and electrically connected to the terminal body, wherein the spiral wiring comprises a linear portion formed as a straight line or a curved line, and a bent portion formed as a meandering line, and wherein the bent portion is configured to form a magnetic field in a direction that is the same as a direction of a magnetic field formed by the linear portion.

14. A portable terminal, comprising:
a terminal body; and
a spiral wiring comprising a ring shape and electrically connected to the terminal body; and
a magnetic part disposed on a surface of the spiral wiring and configured to provide a magnetic path of a magnetic field generated by the spiral wiring, wherein the spiral wiring comprises a linear portion formed as a straight line or a curved line, and a bent portion formed as a meandering line.

* * * * *